US006866006B1

(12) United States Patent
Annis

(10) Patent No.: US 6,866,006 B1
(45) Date of Patent: Mar. 15, 2005

(54) AQUARIUM SYSTEM

(76) Inventor: David Annis, 2473 Small Acres La., Okemos, MI (US) 48864

( * ) Notice: Subject to any disclaimer, the term of this patent is extended or adjusted under 35 U.S.C. 154(b) by 0 days.

(21) Appl. No.: 10/796,555

(22) Filed: Mar. 9, 2004

Related U.S. Application Data

(60) Provisional application No. 60/537,678, filed on Jan. 20, 2004.

(51) Int. Cl.[7] .............................................. A01K 63/00
(52) U.S. Cl. ...................... 119/245; 119/267
(58) Field of Search ............................. 119/245, 246, 119/247, 248, 253, 257, 266, 267, 269; D30/105, 106, 107

(56) References Cited

U.S. PATENT DOCUMENTS

| | | | |
|---|---|---|---|
| 1,634,305 A | * | 7/1927 | Schrimp ..................... 119/267 |
| 1,908,939 A | * | 5/1933 | Venditti ..................... 119/267 |
| 3,316,882 A | * | 5/1967 | Renwick .................... 119/269 |
| 3,730,138 A | | 5/1973 | Suchowski |
| 4,078,522 A | | 3/1978 | Akers |
| 4,083,528 A | | 4/1978 | Anthony, Jr. et al. |
| 4,820,556 A | | 4/1989 | Goldman et al. |
| 5,067,438 A | * | 11/1991 | Hoffa ........................ 119/269 |
| 5,089,940 A | | 2/1992 | Lanzarone et al. |
| 5,167,445 A | | 12/1992 | Linnenkamp et al. |
| 5,211,469 A | | 5/1993 | Matthias et al. |
| 5,353,746 A | | 10/1994 | Del Rosario |
| 5,471,952 A | | 12/1995 | Tsuchiya |
| 5,649,757 A | | 7/1997 | Aleman et al. |
| 5,690,053 A | | 11/1997 | Strange, Jr. |
| 5,950,563 A | * | 9/1999 | Adcock, Jr. ................. 119/246 |
| 6,564,748 B1 | | 5/2003 | Olsson et al. |

FOREIGN PATENT DOCUMENTS

FR          2576747      *  8/1986

* cited by examiner

Primary Examiner—Yvonne R. Abbott
(74) Attorney, Agent, or Firm—Dobrusin & Thennisch, PC

(57) ABSTRACT

The present invention provides a system and method for improving illumination of aquariums and support of aquatic features placed therein. These improvements are due, at least in part, by providing an aquarium having a recess portion extending inwardly from a wall portion, wherein the recess portion has a transparent or translucent surface for transmitting external light into the container and optionally a shelf structure for supporting aquatic items placed in the aquarium.

20 Claims, 2 Drawing Sheets

AQUARIUM SYSTEM

CLAIM OF BENEFIT OF FILING DATE

The present application claims the benefit of the filing date of U.S. Provisional Application Ser. No. 60/537,678, filed Jan. 20, 2004, hereby incorporated by reference.

FIELD OF THE INVENTION

The field of the Invention relates generally to improving aesthetic presentation of aquariums by improving the illumination characteristics of the same.

BACKGROUND OF THE INVENTION

Aquarium systems traditionally include overhead lighting having elongated bulbs used to illuminated contents contained in aquarium tank. This basic lighting configuration is typically used in most aquariums regardless of the type, size or depth of the water in the tank. However, these light sources do not effectively or efficiently illuminate aquariums having moderate to large water depths. More specifically, the lower regions of these types of aquariums are often left dark or dimly lit. This is due to the fact that for every 12" of water, approximately 50% of the light is absorbed or reflected, which means that light often does not effectively penetrate and transmit light from the water surface to the lower regions of taller aquarium tank. This occurrence is particularly problematic when growing corals, anemones, or other photosynthetic organisms.

Another problem with tall tanks is the small ratio of the area on the bottom of the tank in which to place live rock, to the total tank volume. Live rock aids in the maintenance of water chemistry and provides habitat for reef organisms.

One response to this inability to light lower regions has been to provide replacement light sources, or bulbs, having a greater intensity than what was previously offered. Unfortunately, these higher intensity sources have effectively failed to rectify this problem in tanks having larger depths. Also, these lighting systems and bulbs are costly as they require substantially more energy to illuminate. As such, there is still a need for an aquarium system having improved illumination characteristics without substantially increasing the energy requirements to illuminate the same.

SUMMARY OF THE INVENTION

The aquarium of the present invention includes a container defined by one or more walls and a base portion, wherein the container has an interior portion adapted to receive and contain a liquid. A recess located on at least one of the one or more walls, wherein the recess extends into the interior portion of the container and includes a transparent or translucent surface adapted to transmit light to the interior portion of the container.

DESCRIPTIONS OF THE DRAWINGS

DETAILED DESCRIPTION OF THE PRESENT INVENTION

Figure 1:
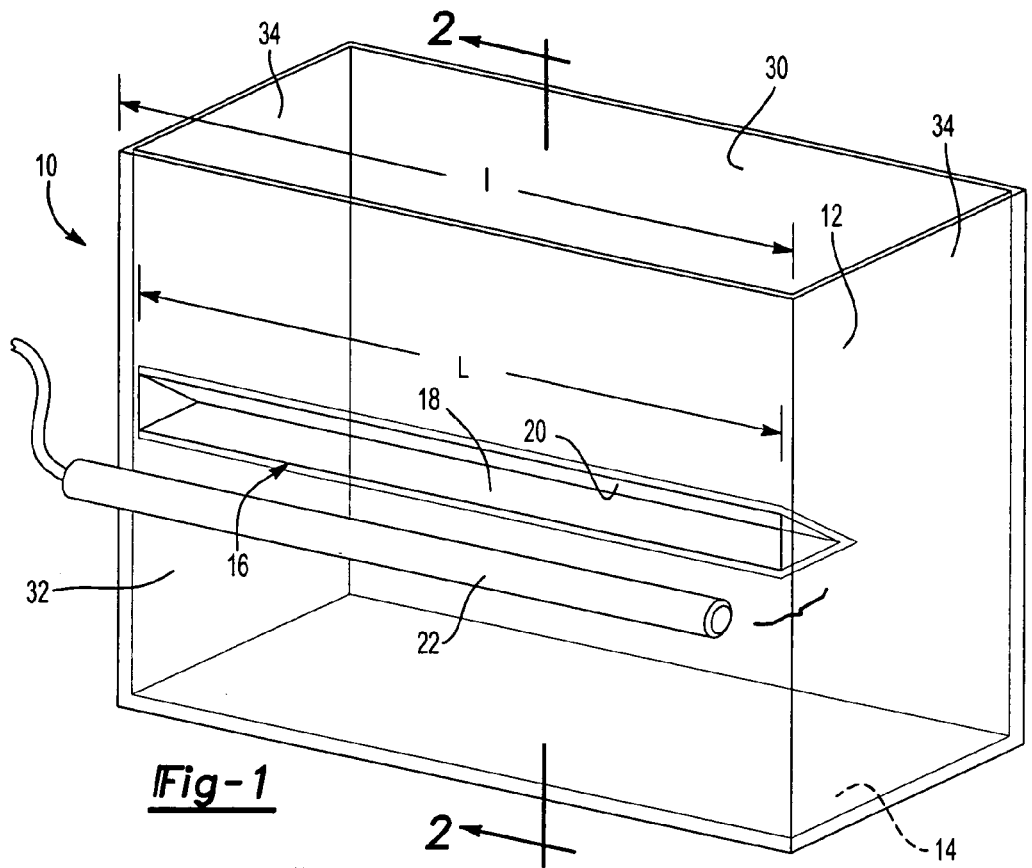
FIG. 1 is a perspective view of a first embodiment of the present invention.

Referring to the drawings, exemplary embodiments of the aquarium of the present invention are illustrated. In general, the aquarium includes a container 10 having one or more walls 12 and a base portion 14 to define an interior portion adapted to receive and contain liquids. The aquarium further includes a recess portion 16 preferably located on one or more of the walls 12. It should be appreciated that the recess portion 16 extends into the interior portion of the container 10 and provides a light conduit for the transmission of light so as to illuminate desired portions of the container 10 and optionally to provide structural support for items placed within the container 10. A light conduit may be defined as a member configured to allow light to pass therethrough, which optionally may further be configure to direct the dissemination of the light. Preferably, the recess portion 16 is located below the water surface and allows light to be projected to lower portions of the aquarium.

In a preferred embodiment, the recess portion 16 comprises a support member 18 and a shelf member 20 both extending from a wall portion 12 toward the interior portion of the container. Preferably, the support member 18 and shelf portion 20 combine at their respective ends to form a recess adapted to receive and support one or more suitable light source 22. However, it should be appreciated that the recess portion 16 may not receive the light source 22 but instead only direct or otherwise allows light to travel therethrough to illuminate aquatic items placed within the container 10.

As such, preferably the support member 18 is transparent, translucent or otherwise configured to allow light to be transferred therethrough. Furthermore, it is contemplated that the support member 18 is configured so as to support a light source 22 while still maintaining translucent characteristics. While the support member 18 is illustrated in the drawings as being substantially planar, it should be appreciated that the support member may be non-planar or comprise more than one segment. For example, the support member 18 may comprise a curved portion for increasing the dissemination of light to the aquarium or for assisting in the placement of the light source.

The shelf member 20 is preferably configured to support and optionally, mount, place or otherwise secure living and non-living aquatic items (e.g., coral, live rocks, plants, combination thereof or the like) thereto. As such, it is contemplated that the shelf member 20 may comprise different shapes for different applications. For example, the shelf member 20 may be larger or flatter in profile, with respect to what is shown, in a salt water aquarium so as to provide support for coral or other living or non-living salt water items that may be larger or possess an unusual shape. It is also contemplated that the shelf member 20 may further include features for assisting in mounting or securing the above items to the shelf member itself, which is discussed later in more detail. It is further contemplated that the shelf member 20 may comprise a mirror or otherwise have reflective properties so as to direct extraneously disseminated light though the transparent or translucent support member 18. As with the support member 18, it should also be appreciated that other configurations of the shelf member 20 is available than what is illustrated and thus should not be limiting.

It should also be appreciated that the recess portion 16 may be smaller or larger than shown in the drawings and thus not limiting. For example, it is contemplated that the recess portion may comprise an indentation having a depth "D" twice the thickness "t" of the glass or an indentation that extends half the width "w" of the tank or more. Likewise, the length "L" of the recess portion may also vary, wherein the length L of the recess is equal or less than the length "I" of the aquarium. In a preferred embodiment, the length L of the recess portion and the length I of the tank are the same so as to provide a recess portion having open ends for assisting in the dispersing of heat generated by a light source.

Furthermore, while the drawings may illustrate the support member 18 and the shelf member 20 comprising an integral component formed with one or more walls 12, it should be appreciated that they may be separately formed and attached to each other and wall 12 to form a single component. As such, while only two profiles are shown depicting the recess portion 16, it should be appreciated that other configurations are available. For example, it is contemplated that the recess portion comprises a single member, which includes an arcuate portion adapted to allow light to disseminate to lower portions of the aquarium.

The shape of the aquarium container 10 may vary depending on the aesthetic desires of the owner or its application. Examples of suitable shapes that may be used with the present invention include semi-spherical (e.g., bowl shaped), triangular, square, rectangular, pentagonal, hexagonal, cylindrical, half-cylindrical, custom shape or the like. However, preferably, the container 10 is rectangular in shape and have substantially vertical walls.

The height of the aquarium container 10 may be of any suitable height, either commonly manufactured or custom design. However, in one aspect, the present invention is preferably used with tanks having a height greater than about two feet so as to illuminate regions of the aquarium that are well below the surface of the water and hence difficult to illuminate with energy saving overhead lighting. As such, preferably the recess portion is located approximately 12" or more below the surface of the water contained in the aquarium. However, in another aspect, the present invention may also be preferably used with tanks that are not substantial tall, as the recess portion 16 may be used to assist in the mounting of coral, rocks or otherwise and not strictly for illumination purposes. As such, in this aspect the recess portion may be used anywhere along the height of the wall 12.

It should be appreciated that the thickness of the walls 12 and/or recess portion 16 may be similar or dissimilar. For example, the thickness of a wall 12 supporting an attachment feature, as discussed herein, may be greater than the thickness of the surrounding walls so as to improve mounting ability of an attachment feature. In another example, the thickness of the support member 18, shelf member 20 or both may be greater than the supporting wall 12 attached thereto so as to improve structural support for live rock, corral or the like placed thereon.

Suitable materials that may be used to form the container 10 of the present invention may be any material. Preferred materials include those commonly used in ichthyology or otherwise offered for sale in aquarium shops or the like. Advantageously, the material is adapted to withhold the forces commonly incurred with the containment of water. Some suitable materials includes plastics (e.g. acrylic) and glass, however, it is contemplated that other materials may be used as well.

However, preferably at least one of the walls are at least partially transparent for viewing the content of the tank and the support member 18 is translucent, transparent or otherwise able to allow some transmission of light into the tanks through recess portion 16.

The walls 12, base portion 14 and recess portion 16 may be manufactured using any of the techniques used with the formation of glass or plastic panels or members. Furthermore, it is contemplated that the container 10 may comprise of separate components sealably bonded together or comprise an integrally formed unit. As such, the walls 12, base portion 14 and recess portion 16 may be manufactured using similar or dissimilar materials depending, in part, on the manufacturing procedure selected.

Figure 3:
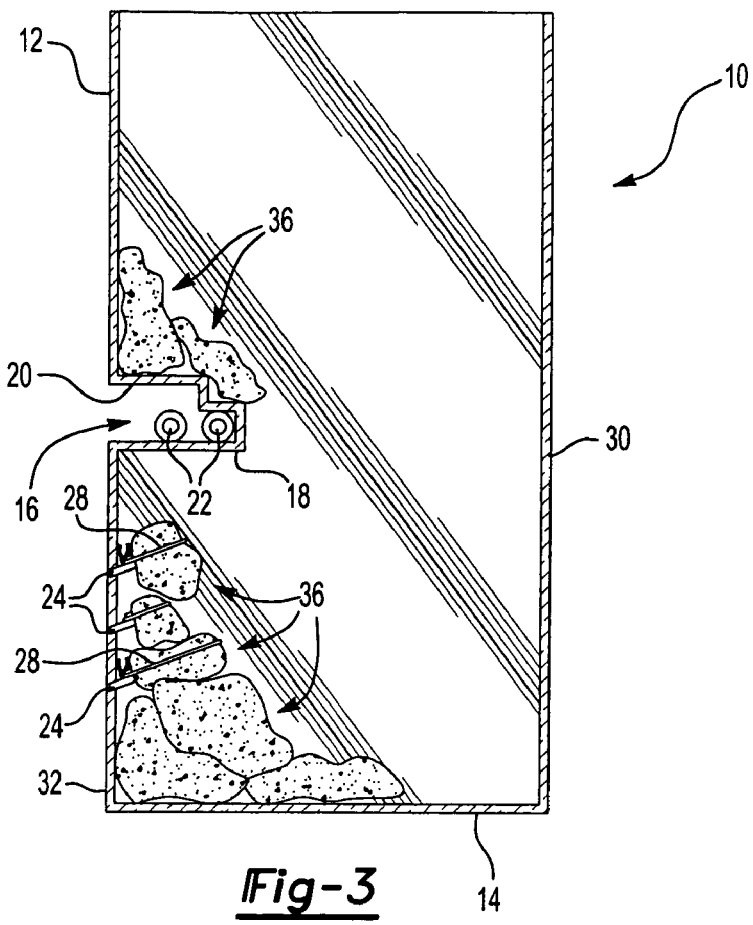
FIG. 3 is a sectional view of a second embodiment of the present invention.
Figure 4:
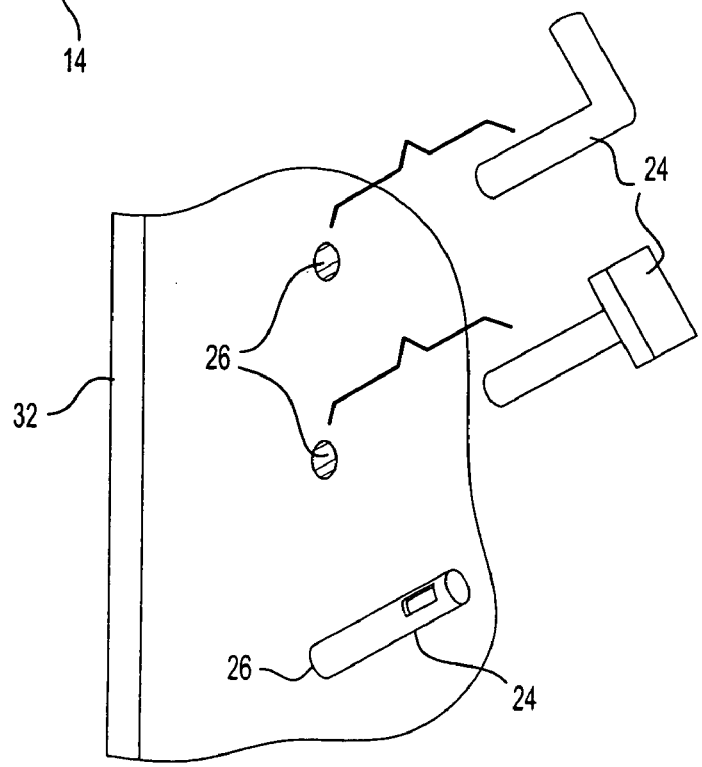
FIG. 4 is an exploded perspective view of attachment features which may be included with any of the embodiments of the present invention.

Optionally, as previously discussed with the shelf member 20 and as best illustrated in FIGS. 3 and 4, the container may further comprise an attachment feature 24 for the securing or supporting aquatic items placed within in the container 10 (e.g., coral, live rocks or otherwise). The attachment features 24 may be located on the inverse portion of recess portion 16 (e.g. shelf 20 to assist in the stacking or placing of items on the same). Alternatively, as demonstrated in FIG. 3, the attachment features 24 may be attached to the walls 12 of the container 10. As may be appreciated, the attachment features 24 may be integrally formed or attached to the walls using known techniques. For example, as demonstrated in FIG. 4, the attachment feature 24 may be placed in opening 26 and mechanically or adhesively attached to the wall 12.

The attachment feature 24 is preferably adapted to engage with a restraining feature 28 for restricting an aquatic items placed in the container 10 to a specific locality. As such, as demonstrated in FIG. 4, the attachment feature 24 may be configured to engage with the restraining feature 28. Suitable configurations for the attachment feature 24 include "L-shaped", "T-shaped" or an elongated member having a hole for attachment with a string, wire, zip-ties combinations thereof or the like.

Figure 2:
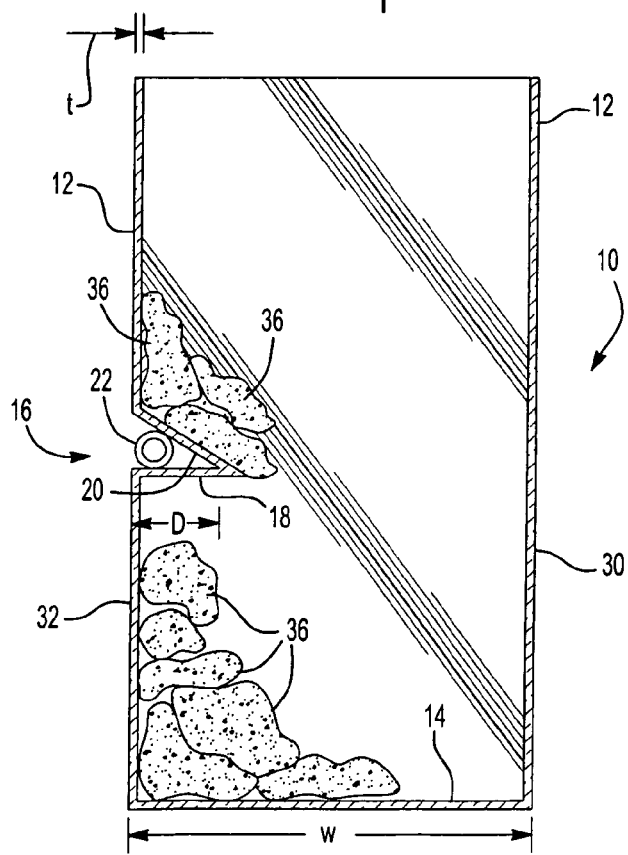
FIG. 2 is a sectional view of the first embodiment taken through FIG. 1.

Advantageously, as illustrated in FIGS. 2 and 3, it is contemplated that the attachment feature 24 may be used to substantially hide the recess portion 16 and/or back wall 12 of the container 10 to create a more natural setting.

EXAMPLES

In a first exemplary embodiment, as shown in FIGS. 1 and 2, an aquarium comprises a container having one or more walls 12. In this configuration, the one or more walls are defined by a front wall 30, a back wall 32 and two side walls 34. The back wall 32 of the container 10 includes a recess portion 16 adapted to receive and support one or more light sources 22. The recess portion 16 includes a transparent or translucent support member 18 adapted to support light source 22 and a shelf member 20 adapted to support and optionally secure aquatic items or otherwise to the container 10.

As best shown in FIG. 2, the transparent or translucent support member 18 allows light to be transmitted from one or more light source 22 to the aquarium decoration located below (e.g. rock 36). Also, as illustrated the shelf member is adapted to support the one or more light sources and aquatic decoration attached thereto.

In a second exemplary embodiment, as shown in FIG. 3, a similar aquarium to that of the first embodiment is shown with the exception to the shelf member 20. In this embodiment, the shelf member 20, comprises a plurality of segments which are formed together to form the shelf member 20. With this configuration, it is possible to better support aquarium decoration by providing a more flat surface for placement of the same. As previously mentioned, the present embodiment also includes a plurality of attachment features 24 joined with restraining features 28 for securing aquarium decoration, which can be live rock, to desired localities within the container 10.

In view of the foregoing discussion, the present invention provides a system and method for providing improved lighting for an aquarium. In addition, the present invention further provides a support structure for placement and securing of aquatic items.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only three of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. An aquarium comprising:
a container defined by one or more substantially vertical walls and a base portion, the container having an interior portion adapted to receive and contain a liquid; and
a recess located on at least one of the one or more substantially vertical walls, wherein the recess extends into the interior portion of the container and includes a translucent or transparent surface adapted to transmit light to the interior portion of the container.

2. The aquarium of claim 1, further comprising a light source for illuminating the interior portion of the container.

3. The aquarium of claim 2, wherein the light source is located in the recess formed in the one or more walls.

4. The aquarium of claim 1, wherein the recess portion is defined by a translucent or transparent support member and a shelf member joined therewith.

5. The aquarium of claim 4, wherein the support member and shelf member are integrally formed with at least one of the one or more walls.

6. The aquarium of claim 5, wherein the one or more walls comprises plastic.

7. The aquarium of claim 1, wherein the one or more walls comprises glass.

8. The aquarium of claim 1, wherein the one or more walls includes a front wall, a back wall and two side walls and wherein at least one wall is substantially planar.

9. The aquarium of claim 8, wherein the recess is formed in the back wall.

10. The aquarium of claim 1, further comprising an attachment feature located on at least one of the one or more walls, wherein the attachment feature is adapted to assist in securing decorations or live rock.

11. The aquarium of claim 1, further comprising an attachment feature located on the interior of the recess portion.

12. The aquarium of claim 1, wherein the height of the container is greater than about 2 feet.

13. A method of forming an aquarium comprising the steps of:
forming a recess in one or more substantially vertical wall portions, wherein the recess includes a transparent or translucent surface adapted to support a light source and transmit light therethrough; and
attaching the one or more substantially vertical wall portions to a base to form a container having an interior portion adapted to receive and contain a liquid.

14. An aquarium comprising:
a container defined by one or more walls and a base portion, the container having an interior portion adapted to receive and contain a liquid; and
a recess located on at least one of the one or more walls, wherein the recess extends into the interior portion of the container and includes a translucent or transparent surface adapted to transmit light to the interior portion of the container, wherein the recess portion is defined by a support member and a shelf member joined therewith, and wherein the support member and shelf member are integrally formed with at least one of the one or more walls.

15. The aquarium of claim 14, further comprising a light source for illuminating the interior portion of the container.

16. The aquarium of claim 15, wherein the light source is located in the recess formed in the one or more walls.

17. The aquarium of claim 16, wherein the one or more walls comprises plastic.

18. An aquarium comprising:
a container defined by one or more walls and a base portion, the container having an interior portion adapted to receive and contain a liquid; and
a support member formed with at least one of the one or more walls, wherein the support member extends into the interior portion of the container and is adapted to assist in securing decorations or live rock.

19. The aquarium of claim 18, further comprising a shelf member joined with the support member, wherein the support member and shelf member are integrally formed with at least one of the one or more walls.

20. The aquarium of claim 18, further comprising an attachment feature located on the interior of the support member.

* * * * *